United States Patent [19]

Gerth et al.

[11] Patent Number: 4,708,986

[45] Date of Patent: Nov. 24, 1987

[54] PROCESS FOR PRODUCING THERMOPLASTIC MOLDING COMPOSITIONS FROM POLYCONDENSATION RESINS AND AQUEOUS LATEXES

[75] Inventors: Christian Gerth, Haltern; Michael Dröscher, Dorsten, both of Fed. Rep. of Germany

[73] Assignee: Huels Aktiengesellschaft, Marl, Fed. Rep. of Germany

[21] Appl. No.: 776,075

[22] Filed: Sep. 13, 1985

[30] Foreign Application Priority Data

Sep. 15, 1984 [DE] Fed. Rep. of Germany ....... 3433976
Jul. 16, 1985 [DE] Fed. Rep. of Germany ....... 3525319

[51] Int. Cl.$^4$ .............................................. C08G 63/18
[52] U.S. Cl. .................................. 525/177; 525/184; 525/227
[58] Field of Search ............... 525/139, 141, 177, 184, 525/164, 55, 227

[56] References Cited

U.S. PATENT DOCUMENTS

| | | | |
|---|---|---|---|
| 2,819,246 | 1/1958 | Lindenfelser | 525/164 |
| 3,300,426 | 1/1967 | Hunsucker | 525/139 |
| 3,498,941 | 3/1970 | Hofton | 525/184 |
| 3,660,531 | 5/1972 | Lauchlan | 525/177 |
| 3,742,093 | 6/1973 | Skidmore | 528/501 |
| 3,752,093 | 6/1973 | Skidmore . | |
| 4,174,358 | 11/1979 | Epstein | 525/184 |
| 4,320,213 | 3/1982 | Woodbrey | 525/184 |
| 4,438,237 | 3/1984 | Brandstetter | 525/184 |
| 4,554,320 | 11/1985 | Reimann | 525/184 |

FOREIGN PATENT DOCUMENTS 0056123 7/1982 European Pat. Off. .

*Primary Examiner*—Paul R. Michl
*Attorney, Agent, or Firm*—Millen and White

[57] ABSTRACT

The invention relates to a process for the production of molding compositions from a thermoplastic polycondensation resin susceptible to degradation at high temperature in the presence of $H_2O$, to which is admixed a second synthetic resin, present as an aqueous latex, at temperatures in the range of 150°–300° C. and under a pressure in the range of 1–100 bar under the effect of high shear forces, for a time sufficient to provide the desired molding composition without substantially degrading the polycondensation resin.

14 Claims, No Drawings

PROCESS FOR PRODUCING THERMOPLASTIC MOLDING COMPOSITIONS FROM POLYCONDENSATION RESINS AND AQUEOUS LATEXES

BACKGROUND OF THE INVENTION

This invention relates to a process for producing a mixture of thermoplastic polymers suitable for molding purposes, and in particular where one of the components is a polycondensation polymer.

It has long been the state of the molding composition art to vary and improve the properties of a thermoplastic by intimate admixing of an additional polymer. It has also been known to admix the additional polymer in the form of an aqueous latex to the molten thermoplastic (Adv. Polym. Techn. 3:41 et seq. [1983]; U.S. Pat. No. 3,742,093). Only those thermoplastics obtained by addition polymerization processes are cited in the art as molten polymers to which the latex can be admixed. Resins, obtained by polycondensation processes, are not mentioned.

Furthermore, the addition of elastomeric graft copolymers to polyesters has been disclosed (European Patent No. 56,123). The graft copolymers can contain relatively large amounts of water. In order to obviate the danger of degradation of the polyester, the water content is limited to maximally 50% by weight. The use of not dewatered polymerizate latices with a water content of above 50% by weight is neither disclosed or suggested.

This is not surprising since one skilled in the art would know that polycondensation resins, especially in molten condition, are extremely sensitive to water and steam, being subject on contact to decomposition and a marked reduction in molecular weight. (T. Davies in "Chemical Reactions of Polymers" - E. M. Fetters Editor, High Polymers XIX, Interscience Publishers, N.Y., 1964, pp. 533 et seq.; R. Feldmann, R. Feinauer, "Angewandte Macromoleculare Chemie" [Applied Macromolecular Chemistry] 54:1-13[1976]).

SUMMARY OF THE INVENTION

It is an object of this invention to provide a process for the production of molding compositions based upon a thermoplastic, said thermoplastic comprising a polycondensation resin susceptible to degradation at high temperature and in the presence of $H_2O$, and comprising an additional synthetic resin in the form of an aqueous latex Upon further study of the specification and appended claims, further objects and advantages of this invention will become apparent to those skilled in the art.

These objects are attained by the invention which concerns molding compositions based on a polycondensation resin-based thermoplastic to which is admixed at least one additional synthetic resin. The additional resin is present as an aqueous latex and is admixed to the thermoplastic at an elevated temperature, under elevated pressure and under the effect of strong shear forces.

It is surprising and unexpected that this mixing technique can be applied to polycondensation resins in light of the difficulties enumerated in the prior art above. The additional synthetic resin, in the form of an aqueous latex, is admixed to the molten polycondensation resin at temperatures of from about 150° to 300° C., preferably about 200°-280° C., and under a pressure of from about 1 to 100 bar. The mixing temperature is preferably about 10°-70° C., more preferably about 15°-40° C., above the melting point of the initial polycondensation resin.

Thermoplastics useable in the process of the invention are polycondensation resins susceptible to degredation by $H_2O$ at high temperatures and include homopolyesters, copolyesters, block copolyesters, especially those based on terephthalic acid (Sorensen and Campbell, *Preparative Methods of Polymer Chemistry*, Interscience Publishers Inc., N.Y., 1961, pp. 111-127; Kirk-Othmer, Encyclopedia of Chemical Technology, John-Wiley and Sons [1982] 18:549-574; U.S. Pat. No. 2,465,319; U.S. Pat. No. 3,047,539). Other suitable resins include polyamides, thus, for example, polyamides 6, 6/6, 6/12 or 12 (U.S. Pat. Nos. 2,071,250, 2,071,251, 2,103,523, 2,130,948, 2,241,322, 2,312,966, 2,512,606, 3,393,210; Kirk-Othmer, *Encyclopedia of Chemical Technology*, John-Wiley and Sons [1982] 18:328-435), polycarbonates (U.S. Pat. Nos. 3,028,365, 3,275,601, 3,148,172, 3,062,781, 2,991,273, 3,271,367, 2,999,835, 2,970,131, 2,999,846; DOS's 1,570,703, 2,063,050, 2,063,052, 2,211,956, 2,211,957; French Patent No. 1,561,518; H. Schnell, "*Chemistry and Physics of Polycarbonates*", Interscience Publishers, N.Y. 1964).

The added synthetic resin is present as an aqueous latex. These resins themselves are known; also known is their usually deleterious effect on the initial polycondensation resins (German Patent No. 1,260,135, DAS, No. 2,622,973, DOS, No. 2,622,876, DOS, No. 3,245,292, WP No. 82 03 222; F. Hoscher, "*Dispersionen synth. Hochpolymerer*" [Dispersions of Synthetic High Polymers] I, Springer Publishers, Berlin, 1969; *Encyclopedia of Polym. Sci. Technology*, 8:164-195, Interscience Publishers, N.Y., 1968; C. B. Bucknall, "*Toughened Plastics*" Appl. Science Publishers, London, 1977; Poelein, G. W. et al., "*Science and Technology of Polymer Colloids*" vols. I and II, Martinus Nijhoff Publishers, Den Haag, 1983). These added resins are based upon copolymers derived from styrene, monomers including acrylonitrile, conjugated dienes, such as butadiene, isoprene or chloroprene, unconjugated dienes, alphaolefins, vinyl chloride, vinylidene fluoride and vinyl acetates. Additionally, it is also possible to employ monomers having functional groups such as acrylic acid, methacrylic acid, unsaturated dicarboxylic acids of 4-20 C atoms and/or derivatives thereof, compounds which contain epoxy, amino, ester or hydroxy groups. Such latices usually exhibit a solids content of 5 to <50% by weight, preferably 30 to <50% by weight. In genera, these monomers are polymerized by addition polymerization, and for the purpose of this invention, the aqueous latex will be defined as an aqueous latex of an addition polymer.

The molding compositions produced by the process of this invention can also contain polycondensation resins obtained by mixing various polycondensation resins, or by mixing a polycondensation resin with other thermoplastic polymers which are not in the form of a latex, such as polyethylene, polypropylene, polystyrene, polymethyl methacrylate (German Patent No. 1,241,606, DAS No. 1,694,190, DOS No. 2,264,268, WP No. 80 00 027).

In the production of molding compositions by the process of this invention, the polycondensation resin based thermoplastic is first melted in a continuous mixer and extruder or in a separate extruder for a time sufficiently brief so as to prevent substantial degradation. The resin may also be introduced directly from the polycondensation reactor into a continuous mixer and extruder. The mixer-extruder can contain, for example, two screws operating without meshing, or meshing in contrarotation or unidirectional rotation. See U.S. Pat. No. 3,742,093 incorporated by reference herein. However, it is possible to utilize other, continuously conveying mixing units providing substantial mixing action and an effective devolatilization of the melt.

The mixer must, of course, be operated so that the contact time of the aqueous latex with the polycondensation polymer will be sufficient to form a substantially homogeneous blend but insufficient to result in any serious degradation of the polycondensation polymer.

A decrease of J-value by more than 15 cc/g is regarded as serious degradation.

The described mixing process takes place in the extruder within about 1–2 minutes. This value can vary within wide limits, depending on the type of extruder. In correspondence with the mentioned total time, the residence times in the individual sections of the extruder will then merely amount to fractions of minutes.

The latex must be adequately resistant to shearing and is introduced by means of a suitable pump, for example a piston-diaphragm pump or a "Moyno" pump (Producer: Netzch-Mohnopumpen-GmbH, Waldkraiburg, W. Germany), into the second opening of the mixing unit. The amount of latex, calculated as the solid proportion, is about 1–400 parts by weight, based on about 100 parts by weight of polycondensate melt. A concentration of about 5–100 parts by weight of latex solids content is preferred; especially preferred is a latex concentration from about 10 to 40 parts by weight of latex solids content. The aqueous phase is separated by mechanical squeezing and/or evaporation by expansion in a degasifying barrel of the mixing unit or in a subsequent devolatilizing extruder. The molding composition is continuously extruded, cooled and granulated. The molding compositions of this invention can additionally be subjected to solid-phase recondensation.

Conventional additives and auxiliary agents, such as pigments, processing agents, fillers and reinforcements, stabilizers against hydrolysis or UV radiation can be incorporated during manufacture as well as into the finished molding compositions.

In view of the prior knowledge available in the state of the art, it is unexpected that in the above, simple way, polymer mixtures are obtained without any serious deterioration in the quality of the polycondensate utilized as the basic resin.

EXAMPLES

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever. In the following examples, all temperatures are set forth uncorrected in degrees Celsius; unless otherwise indicated, all parts and percentages are by weight.

The viscosity number (J) of the polybutylene terephthalate below was determined according to DIN [German Industrial Standard]16 779, part 2, on solutions of 0.5 g of polybutylene terephthalate in 100 ml of phenol/o-dichlorobenzene (50/50 parts by weight) at 25° C.

The relative solution viscosity ($\eta_{rel}$) below was determined according to DIN 53 727 in m-cresol at 25° C. (concentration 0.5 g/dl).

The laboratory twin-screw extruder—Leistritz LSM 30.34—(Erdmenger system, G. Matthews, "Polymer Mixing Technology" Appl. Science Publishers, London, 1982) is of the co-rotating, self-wiping type and employs a modular design in which ten individual barrel sections (L=3,5 D) and screw elements (D=34 mm) are placed in an arrangement which provides optimum operating conditions, residence times and temperatures for the given operation. In the first feeding zone of the twin-screw extruder the polycondensate can be fed as a melt by a single-screw extruder or as an alternative directly as granular material. In the second zone of the twin-screw extruder the latex is injected by the pump. The third zone of the twin-screw extruder contains kneading discs to achieve great efficiency of mixing of the melt and the latex. In the fourth zone of the twin-screw extruder devolatilization of the blend takes place with vacuum assistance. In the fifth last zone of the twin-screw extruder pressure is build up for extrusion.

The residence times of the polycondensate in the twin-screw extruder are below 5 minutes.

The examples not in accordance with the invention are denoted by letters.

EXAMPLE 1

An aqueous latex based on styrene and butadiene (styrene/butadiene ratio: 23.5:76.5% by weight; solids content: 48% by weight) is fed in metered quantities into the second zone of a laboratory twin-screw extruder (Leistritz 30.34) with screws rotating in the same direction, using a piston-diaphragm pump while, via the first zone of the extruder, a commercially available homopolybutylene terephthalate (J=105 cc/g) ("VESTODUR" 1000) is introduced. The latex quantity is added so that the styrene/butadiene polymer proportion in the finished molding composition amounts to 21% by weight. The melting temperature is 250° C. In zones 5 and 8 of the extruder, having a length of, in total, 10 zones (33.5 D), the melt is degasified with application of a vacuum by vaporization of the water. The residual water content of the melt at the discharge nozzle of the kneader is 0.1–0.15% by weight. The melt is cooled in a water bath, continuously extruded, and dried (ejection: 5 kg/h). The viscosity number (J) is—based on the polyester proportion—100 cc/g.

EXAMPLE 2

The molding compositions are produced as set forth in Example 1. The granulated material is subjected to a thermal aftertreatment for 24 hours in a tumbler dryer at 200° C., 40 mbar and under a nitrogen stream of 0.5 m³/ h. The viscosity number (J)—based on the polyester proportion—is 115 cc/g.

EXAMPLE 3

The process is conducted as described in Example 1, using a polybutyl acrylate latex (solids content: 35% by weight). The viscosity number (J)—based on the polyester proportion—is 98 cc/g.

EXAMPLE 4

The molding composition prepared in Example 3 is thermally aftertreated in granular form at 200° C., 40 mbar, and in a nitrogen stream (0.5 m³/h) for 24 hours. The viscosity number (J) is—based on the polyester proportion—110 cc/g.

EXAMPLE A

The latex disclosed in Example 1 is precipitated, dried, ground into crumbs at low temperature and directly thereafter mixed in a laboratory mixer with the homopolybutylene terephthalate utilized in Example 1 in a weight ratio of 20:80. The granulated mixture is melted (250° C.) and mixed in the twin screw extruder described in Example 1. The melt is discharged into a water bath, continuously extruded, and dried. The viscosity number (J) is—based on the polyester proportion—101 cc/g.

EXAMPLE 5

The SBR latex disclosed in Example 1 is incorporated, according to the procedure indicated therein, into a commercially available polyamide ($\eta_{rel}=1.7$) ("VESTAMID" L1700) in a weight ratio of 20:80. The $\eta_{rel}$ value of the mixture is—based on the polyamide proportion—1.67.

EXAMPLE B

The process is conducted as in Example A, but using, in place of the polyester, the polyamide from Example 5. The $\eta_{rel}$ value of the mixture—based on the polyamide proportion—is 1.68.

Examples 1 and 5 compared to A and B show, that in spite of the high water content in the latex the degradation (hydrolysis) of the polycondensate is not higher than in the "dry" procedures described in A and B.

On the other hand the procedure of the invention is in principle applicable to all rubbers available in latex form because there is no drying step involved which in most cases will cause flow and extruder feeding problems (coagulation, impossibility to get granules, pellets or crumbs) for most latices of rubbers with glass temperatures below −0° C.

EXAMPLE 6

A commercially available latex based on a synthetic resin of butadiene, acrylonitrile and methacrylate acid (butadiene/acrylonitrile/methacrylic acid ratio: 64:30.5:4.5% by weight; content of functional groups: 2.9 mol-% carboxy groups; solids content; about 45% by weight; glass transition temperatures: −23° C.)("PERBUNAN" N-Latex VT) is processed, in correspondence with the steps in Example 1, with the polyester described therein, to obtain a molding composition.

The viscosity number (J) is—based on the polyester proportion—100 cc/g.

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is;

1. A process for the production of a molding composition, comprising contacting an aqueous latex and a thermoplastic polycondensation polymer susceptible to degradation in the presence of water, wherein said thermoplastic condensation polymer comprises a polyester and said contacting is effected at sufficiently high temperatures and under sufficiently strong shear forces, for a time sufficiently brief to prevent serious degradation of the polycondensation polymer and sufficiently long to provide a substantially homogeneous molding composition.

2. A process according to claim 1, wherein said contacting is effected at about 150° to 300° C. and for about 5 minutes or less.

3. A process according to claim 1, wherein said contacting is effected at about 200° to 280° C. and for about 5 minutes or less.

4. A process according to claim 1, wherein said contacting is effected under a pressure of about 1–100 bar.

5. A process according to claim 1, wherein said contacting is effected at a temperature of about 10°–70° C. above the melting point of said polycondensation product.

6. a process according to claim 1, wherein said contacting is effected at a temperature of about 15°–40° C. above the melting point of said polycondensation polymer.

7. A process according to claim 1, wherein said polycondensation polymer comprises a polyalkylene terephthalate.

8. A process according to claim 1, wherein said aqueous latex comprises a styrene-butadiene polymer.

9. A process according to claim 1, wherein said aqueous latex comprises an acrylate polymer.

10. A process according to claim 8, wherein said aqueous latex comprises a styrene-butadiene polymer.

11. A process according to claim 7, wherein said aqueous latex comprises an acrylate polymer.

12. A process according to claim 1, wherein the aqueous latex exhibits a solid content of about 30 to less than 50 wt %.

13. A process according to claim 1, wherein the aqueous latex exhibits a solid content of about 5 to 50 wt %.

14. A process according to claim 1, wherein about 5 to 100 parts by weight of an aqueous latex solid is present based on 100 parts by weight of polycondensate melt.

* * * * *